F. W. CROSBY.
Improvement in Furnaces for Roasting Metallic Ores.

No. 115,031. Patented May 23, 1871.

Witnesses.

Inventor.
Francis W. Crosby

F. W. CROSBY.
Improvement in Furnaces for Roasting Metallic Ores.
No. 115,031. Patented May 23, 1871.
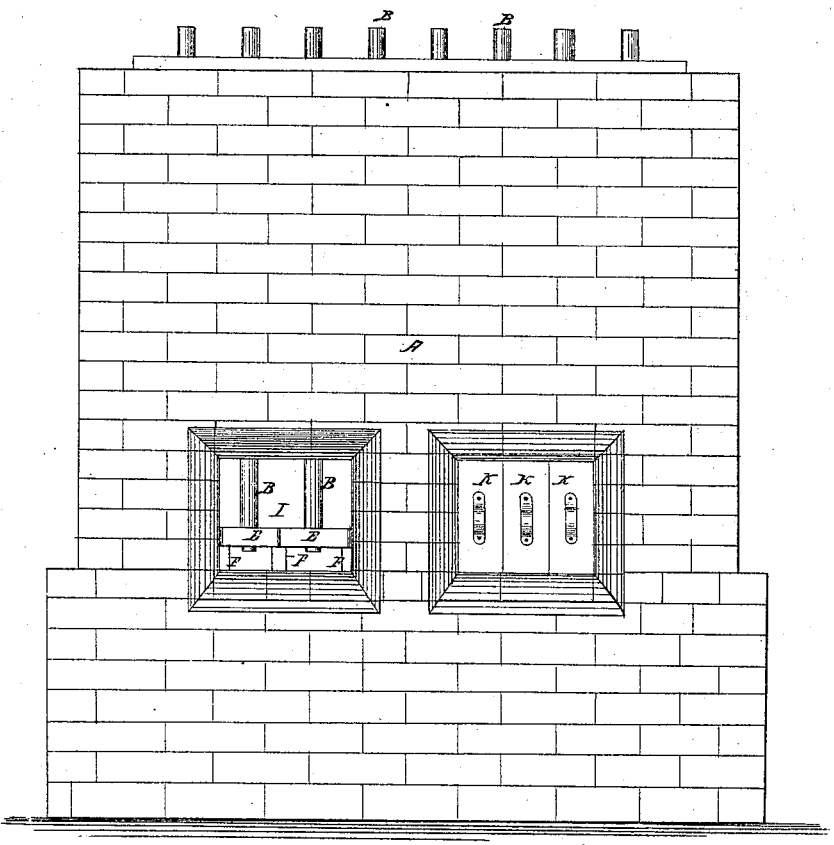

115,031

UNITED STATES PATENT OFFICE.

FRANCIS W. CROSBY, OF WASHINGTON, DISTRICT OF COLUMBIA.

IMPROVEMENT IN FURNACES FOR ROASTING METALLIC ORES.

Specification forming part of Letters Patent No. 115,031, dated May 23, 1871.

I, FRANCIS W. CROSBY, of Washington city, District of Columbia, have invented certain Improvements in Furnaces for Roasting Metallic Ores, of which the following is a specification:

The object sought in this invention is to provide a furnace adapted to the process of roasting in mass crushed and pulverized metallic ores, for which Letters Patent were granted to me on the 7th day of January, 1868.

To accomplish this I use a plain rectangular furnace provided with two or more fire-places, and with an ore-chamber placed directly over the fire-places, with which it is connected by a series of small flues. A few inches above the lower floor of the ore-chamber, and resting on it, is a second floor made of square tiles, with a round hole in the center of each. These tiles are supported on narrow walls extending across the lower floor of the ore-chamber, and so arranged that the small tubes shall be between these supporting-walls, thus forming a series of covered passages, connected with the fire by the small flues, and with the ore-chamber by means of the round holes in each tile.

The method of operating this furnace is as follows: Round wooden rods or poles, of a length something greater than the depth of the ore-chamber, and of a diameter to fit loosely in the holes of the perforated floor, are placed in an upright position, one in each tile. The rods are held in position by light iron guides. The discharge-doors are then closed, and the furnace is ready for a charge. The ore to be roasted is dampened, and if salt or other chemicals are required they are mixed with the charge. The material is then thrown into the ore-chamber around and among the rods. When the chamber is full the ore is leveled down, the guides removed, and the rods withdrawn. Fire is now applied by means of the several fire-places underneath the ore-chamber. The removal of the rods leaves a number of small flues through the entire mass of pulverized ore, so that the flame and other products of combustion can penetrate to every part of the charge. When the ore is sufficiently roasted it is discharged by means of doors placed near the bottom of the ore-chamber, and on one or both sides of the furnace. The heat is controlled and the roasting regulated by covering the holes made by the removal of the rods with small disks of iron or clay, which, by obstructing the draft, have the effect of dampers.

Description of Drawing.

Fig. 3, side elevation of furnace. K K, doors.

Fig. 4, perspective view of door; Fig. 5, perspective view of tile; Fig. 6, perspective view of disk.

Figure 1:
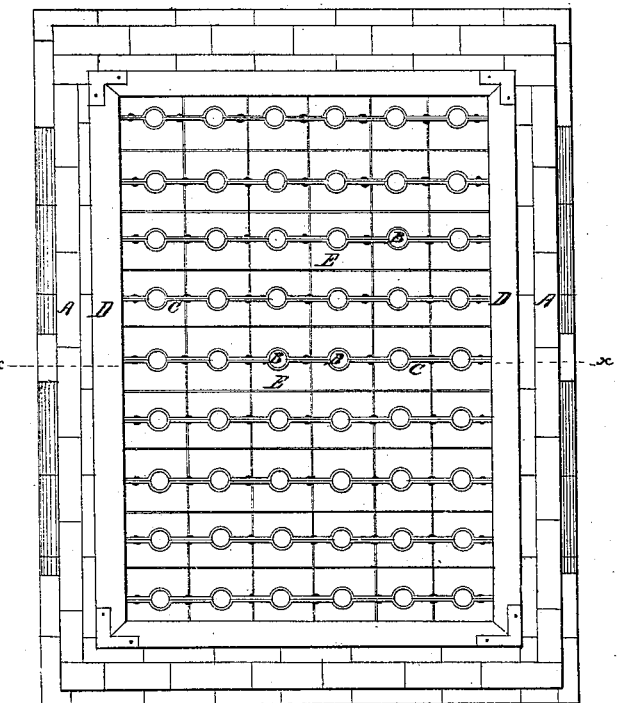
Figure 1, plan of furnace-top. A A, walls; B B, rods; C C, guides; D D, wooden frames to which guides C C are attached; E E, tiles, in which rods B B are inserted.
Figure 2:
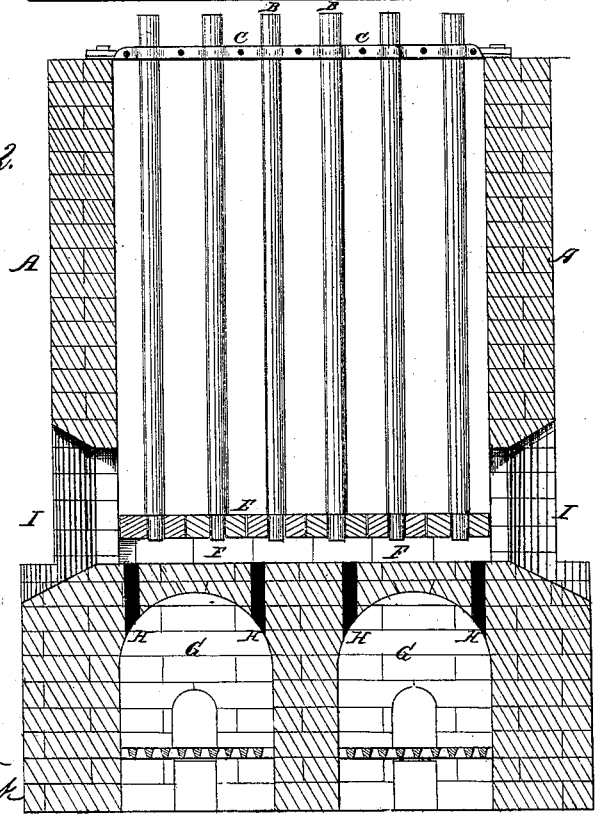
Fig. 2, a sectional view at the line x x, Fig. 1. F F, narrow walls supporting tiles E E; G G, fire-places; H H, small flues; I I, doors for discharging the ore.

Claims.

I claim as my invention—

1. The wooden or iron rods for the purpose of making flues or openings through a mass of pulverized ore.
2. The perforated floor, by which the flues in the ore are made to communicate with the fire-places.
3. The guides for retaining the rods in position while the charge is being put in.
4. The iron or clay disks for controlling the heat.
5. The combination of these devices, for the purposes herein set forth.

FRANCIS W. CROSBY.

Witnesses:
N. B. JUDD,
B. F. LLOYD.